United States Patent [19]
Pitner

[11] 3,848,939
[45] Nov. 19, 1974

[54] RADIAL ROLLING BEARING ASSEMBLY

[75] Inventor: Alfred Pitner, Paris, France

[73] Assignee: Nadella, Rueil Malmaison, France; a part interest

[22] Filed: Dec. 30, 1971

[21] Appl. No.: 214,177

[30] Foreign Application Priority Data
Jan. 29, 1971 France .................. 71.03089

[52] U.S. Cl. .................................. 308/236
[51] Int. Cl. ................................. F16c 33/58
[58] Field of Search ......... 308/178, 186, 236, 187.1

[56] References Cited
UNITED STATES PATENTS

| | | | |
|---|---|---|---|
| 1,210,632 | 1/1917 | Galbraith | 308/186 |
| 1,429,065 | 9/1922 | Daggett | 308/236 |
| 2,016,924 | 10/1935 | Herrmann | 308/186 |

FOREIGN PATENTS OR APPLICATIONS

| | | | |
|---|---|---|---|
| 1,010,792 | 12/1965 | Great Britain | 308/236 |
| 1,809,247 | 7/1969 | Germany | 308/236 |
| 658,470 | 2/1963 | Canada | 308/236 |

Primary Examiner—Charles J. Myhre
Assistant Examiner—R. H. Lazarus
Attorney, Agent, or Firm—Robert E. Burns; Emmanuel J. Lobato; Bruce L. Adams

[57] ABSTRACT

Radial needle bearing assembly comprising a machine element or case and a cold-formed thin sheet metal bearing ring or cup fitted in a bore of the machine element. The ring or cup has an annular portion which axially retains the needles and there is welded to this annular portion an annular element forming part of retaining means which axially retain the bearing ring or cup in the machine element or case and bear against the machine element or case. The metal of the annular element is substantially of the same nature as the metal of the ring or cup and has portion which extends radially beyond the bore.

13 Claims, 6 Drawing Figures

RADIAL ROLLING BEARING ASSEMBLY

The present invention relates to a radial or journal rolling bearing assembly comprising a cold-formed thin sheet metal ring fitted in a bore of a case or other machine element and comprising at least one radial flange for retaining the needle.

The fitting — which implies a radial compression of the ring of which outside diameter in the free state exceeds the diameter of the bore — as a rule ensures that the ring remains in position. However, the stationary character of the ring in its bore may be faulty when the material of the bore opposes insufficient resistance to the force created by the fitting owing to the very nature of this material or of the configuration of the ring-receiving element made from this material.

The fixed position of the ring is not guaranteed either when the thermal expansion of the ring and that of the case or other machine element receiving the ring are not the same, owing to use of different materials, for example when the ring is of steel and the case is of aluminium alloy. There is therefore the problem of the provision of supplementary means for fixing the ring of the bearing.

A solution to this problem has been proposed in the German Utility model No. 1,660,597 which consists of a bead or piping which affords an axial retention of a needle ring of thin sheet metal fitted in a bore. Such a bead is however extremely difficult to produce, since the material employed, which is very highly deformed, must thereafter undergo a heat treatment imparting thereto high surface hardness. Consequently, in operation, the ring may become fragile, in particular when it is fitted in a cavity having low strength, and certain elastic yielding could occur upon the passage of the load.

Another drawback of the known retaining bead is that it prevents a precise length calibration of the raceway in the course of the drawing operation and the performance of the rolling bearing including this ring is adversely affected thereby.

An object of the invention is to provide a solution to the aforementioned problem which is different from the known solution owing to an arrangement according to which there is fixed on a radial flange of the ring retaining means which bears axially against the case or other machine element and comprises an annular element which is welded to the outer face of the radial flange and is substantially of the same nature as the ring and extends radially beyond the bore in which the ring is fitted.

This arrangement, which utilizes the reaction of the face of the case against which the retaining means bear, therefore axially locates the ring in one direction.

The fact that the washer is of a material having the same nature as the ring permits, after having welded the washer to the ring, subjecting the ring-washer assembly to a heat treatment for imparting to the ring the surface hardness which renders it suitable as a raceway for the needles. The washer is therefore preferably of steel.

The washer may bear directly against the case, but it is also possible and often advantageous to provide support means between the washer and the case.

Depending on the nature of the metal of the case, there may occur galvanic corrosion phenomena when there is contact between two dissimilar metals and a solution of electrolytes. As a precaution against galvanic corrosion, contact must be avoided between metals having excessively different electrochemical potentials, for example between aluminium or magnesium and heavy metals, and even steel in the case of magnesium. Contact must above all be avoided which results from connections between large surfaces of noble metals and small surfaces of less noble metals. When this is hardly possible or impossible, the two metals must be insulated from each other with insulating materials, such as plastics materials, rubber, fibres, leathers, asbestoses, sheets of anodically oxidized aluminium, etc, with insulating paints such bituminous paints, lacquers, etc. Alternatively, the contacting surfaces should be at least superficially covered with metals which are less noble than the less noble of the two metals in contact. Inhibitors may also be added to the corrosive liquid so as to obtain a protective layer, or seal off the natural protective layers, or prevent hydrogen from being given off which penetrates the interior of the grains of the metal or their bordering portions. All these solutions have numerous drawbacks or are impossible in particular when the protection concerns parts employed in automobile vehicles which are exposed to the action of mud and other projections containing sodium salts which form an excellent electrolyte. For instance, it is impossible to fix a steel rolling bearing with precision in a case of light metal if the outer ring of the bearing is coated with insulating material in the form of a sheet or paint.

The present invention provides a simple solution to the problem of avoiding any penetration of electrolyte, which would cause galvanic corrosion, between a rolling bearing ring and a case of light metal in which the ring is a drive fit, this solution comprising interposing a flexible sealing ring between the washer, which is fixed to the ring, and the adjacent face of the case.

When the case is of aluminium and consequently has a linear coefficient of expansion twice that of steel, it will be easily understood that a ring which is a drive fit in its cavity at room temperature would be imperfectly held in position at a temperature of around 100°C. The assembly can in this case be completed by a screw which fixes the washer (welded to the ring) to the case so that the ring is positively held in both axial directions.

Further features and advantages of the invention will be apparent from the ensuing description with reference to the accompanying drawings.

Figure 1:
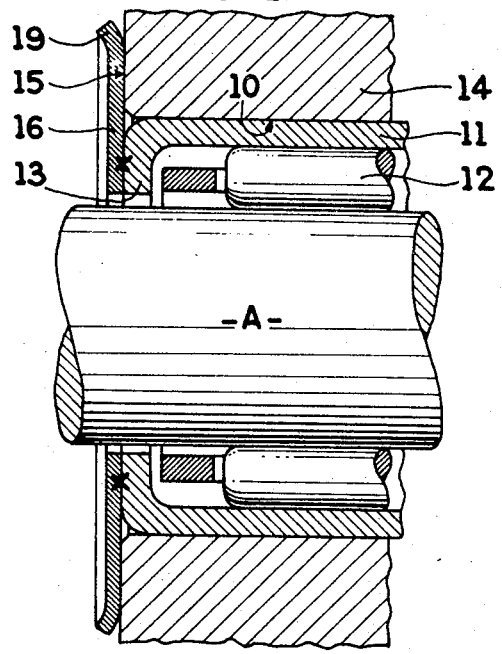
FIG. 1 is a sectional view of a rolling bearing assembly according to the invention.

The rolling bearing shown in FIG. 1 comprises a cylindrical ring 11 of thin sheet steel inside which needles 12 roll. The needles bear against a shaft A and are contained in a cage. An inner flange 13 formed on the ring 11 axially retains the needles. The ring 11 is a drive fit in an aperture or bore 10 in a case 14 of steel which has an outer face 15 perpendicular to the axis of the rolling bearing. On the outer face of the flange 13 of the ring 11 there is welded a washer 16 of the same metal as the ring 11 so as to allow a heat treatment of the assembly consisting of the ring and washer welded to the latter. The washer 16 has an outside diameter which exceeds the outside diameter of the bearing and an inside diameter equal to that of the flange 13 so that it exceeds the diameter of the shaft A. The outer peripheral portion of the washer 16 abuts the radial face 15 of the case 14. In order to avoid any scratching of the face 15 by the washer 16, the latter is slightly formed over or backed-off, as shown, on its outer peripheral portion 19.

Figure 2:
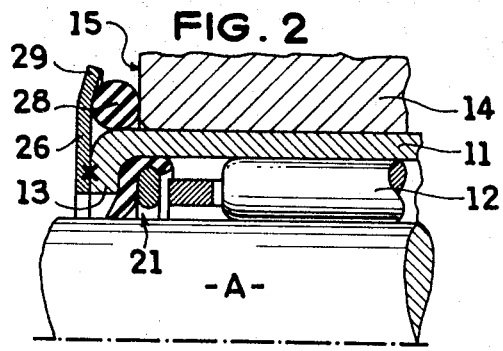
FIG. 2 is a sectional view of a rolling bearing assembly according to the invention combined with a seal for protecting the metal/metal contact between the case and the outer ring of the bearing.

FIG. 2 shows a case 14 which is of light metal, for example an aluminium alloy, and the peripheral portion 29 of the washer 26 is formed over towards the outer face 15 of the case 14. Between the washer 26 and the face 15 of the case there is compressed a flexible sealing ring 28 which furthermore grips the outer face of the ring 11. The rolling bearing contains sealing means 21 to preclude penetration of dirt to the raceways. The sealing means is, for example, in accordance with that disclosed in French Pat. No. 1,448,274 and in the Addition No. 90,193 to this patent.

Figure 3:
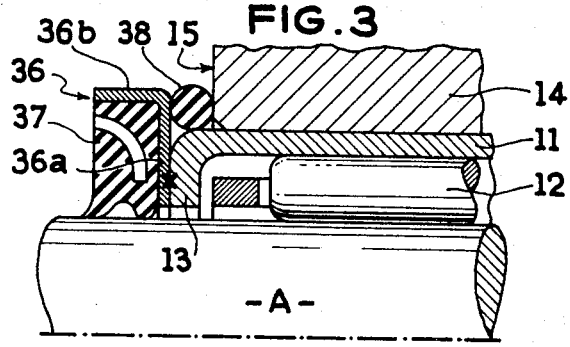
FIG. 3 is a sectional view of a modification of the assembly shown in FIG. 2.

In FIG. 3 the washer 36 has an L-shaped section of which one of the branches 36a is perpendicular to the axis of the bearing and extends outwardly beyond the ring 11 and the other branch 36b is parallel to the axis of the bearing and axially extends the latter. The branch 36a is welded to the outer face of the radial flange 13. Between the axial branch 36b and the shaft it is possible to insert a sealing ring of elastomer 37 which wipes the shaft A, and between the radial branch 36a and the face of the case 14 there is inserted a flexible sealing ring of elastically yieldable material 38 which grips the ring 11.

Figure 4:
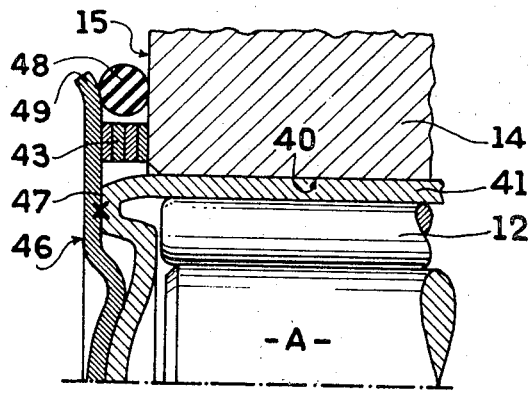
FIG. 4 is a sectional view of a rolling bearing assembly having a bearing cup which is positioned axially by a set of spacer members and combined with a seal.

In FIG. 4 the rolling bearing comprises a needle cup 40 of sheet steel which caps a shaft end portion A. Welded to the end wall 47 of the cup is a washer 46 of steel of the same nature as that of the cup 41. This washer 46 has an outside diameter exceeding the diameter of the washer 36 shown in FIG. 3, since, apart from the elastically yieldable sealing ring 48 the annular space defined between the outer face 15 of the case 14 and the washer 36 receives annular spacer members or shims 43 which very precisely axially position the bearing with respect to the face 14.

Figure 5:
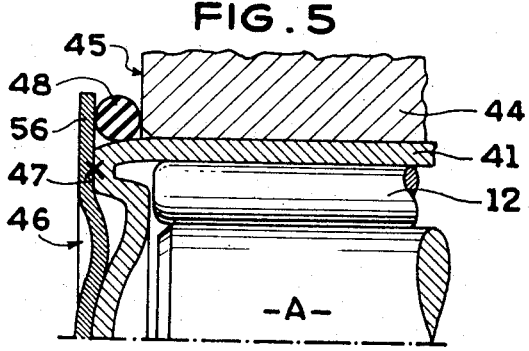
FIG. 5 is a sectional view of a modification of the assembly shown in FIG. 4.

The arrangement shown in FIG. 5 is similar to that shown in FIG. 4 except that the annular spacer members or shims are dispensed with and the washer 56 consequently has an outside diameter less than that of the washer 46 shown in FIG. 4.

Figure 6:
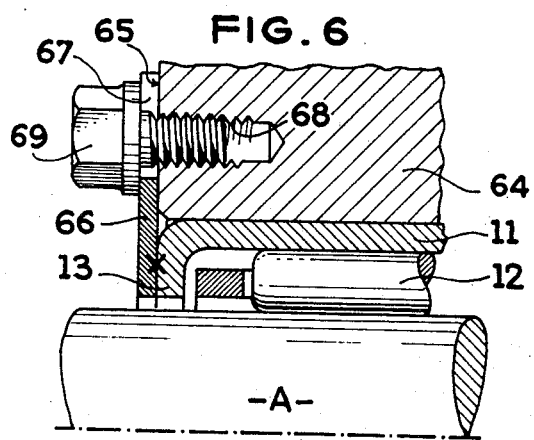
FIG. 6 is a sectional view of a rolling bearing assembly according to the invention which is held in position in both axial directions.

FIG. 6 shows an assembly which retains the bearing in both directions with respect to a case 64 whose face 65 receives thereagainst the washer 66 welded to the flange 13 of the ring 11. The washer 66 is furthermore secured by at least one screw 69 which is screwed into a blind tapped hole 68 formed in the case 64 and extending in a direction perpendicular to the face 65. It will be observed that an aperture or notch 67 is provided in the washer for the passage of the screw 69 and is of sufficient size to accomodate inevitable production errors and the differences in the coefficients of expansion of the washer 66 and the case 64 which is, for example, of light metal.

In the various embodiments described hereinbefore, the washer is in contact with the adjacent radial flange of the ring (FIGS. 2, 3 and 6) or with the end of the cup (FIGS. 4 and 5), on each side of spot welds which arrangement, in the course of the hardening heat treatment, restricts the supply of carbon to the spot welds. In this way it is possible to limit the carbon content of the corresponding zone and the weld cannot harden in depth, which avoids rendering the spot welds weak or fragile.

Having now described my invention what I claim and desire to secure by Letters Patent is:

1. A radial rolling bearing assembly comprising in combination a machine element defining a bore and an outer surface surrounding the bore, a cold-formed member of thin sheet metal which is an interference fit in the bore, said member defining a bearing ring having a longitudinal axis, rolling members within the ring, the ring having an annular portion defining an outer radial face in a plane perpendicular to said axis and an inner radial face which axially retains the rolling members, means for axially locating the bearing ring in the bore, the locating means comprising an annular element which has an annular surface in axial abutment with the outer radial face of the annular portion and is substantially of the same nature of metal as said member and has a portion which extends radially beyond said bore and is in axially supported relation to said outer surface of the machine element, and fusion welding rigidly interconnecting the annular element and the annular portion.

2. An assembly as claimed in claim 1, wherein the annular element is a washer of sheet steel.

3. An assembly as claimed in claim 1, wherein the annular element has a plane surface in direct contact with said surface of the machine element.

4. An assembly as claimed in claim 3, wherein the annular element has an outer peripheral portion which has an annular surface which tapers away from said face on the machine element.

5. An assembly as claimed in claim 3, comprising a screw extending through said annular element and screwthreadedly engaged in the machine element.

6. An assembly as claimed in claim 1, comprising a plane face on the machine element, a flexible elastomer ring interposed between said portion of the annular element which extends radially beyond the bore and said plane on the machine element.

7. An assembly as claimed in claim 6, wherein the bearing ring has an outer face and a flexible ring is applied against the outer face of the bearing ring.

8. An assembly as claimed in claim 1, comprising a plane face on the machine element, annular spacer members interposed between the portion of the annular element which extends radially beyond the bore and said plane face of the machine element.

9. An assembly as claimed in claim 1, wherein the annular element has an L-shaped section in a radial plane containing said axis and defines a radial branch welded to the annular portion of the bearing ring and an axial branch.

10. An assembly as claimed in claim 9, comprising an elastomer sealing ring in contact with the two branches of the L-shaped annular element and retained thereby and provided for sliding contact with a shaft which is to be mounted inside the bearing.

11. An assembly as claimed in claim 1, comprising sealing means located inside the bearing ring and comprising a flexible ring provided for sliding contact with a shaft which is to be mounted inside the bearing.

12. An assembly as claimed in claim 1, wherein said welding consists of spot welds between the annular surface of the annular element and the outer radial face of the annular portion of the bearing ring, the annular surface of the annular element being in contact with the outer radial face of the annular portion of the bearing ring in regions completely surrounding the spot welds thereby constituting means sealing the spot welds off from the exterior.

13. A radial rolling bearing assembly comprising a machine element having a bore, a cold-formed member of thin sheet metal and interference fit in the bore, said member being a cup defining a bearing ring having a longitudinal axis, needles within the ring, the ring having an annular portion defining a radial face which axially retains the needles, retaining means for the bearing ring and in bearing relation to the machine element and comprising an annular element which is welded to the annular portion and is substantially of the same nature of metal as said member and has a portion which extends radially beyond said bore.

* * * * *